(No Model.) 6 Sheets—Sheet 2.
G. N. TODD.
COTTON HARVESTER.
No. 529,430. Patented Nov. 20, 1894.
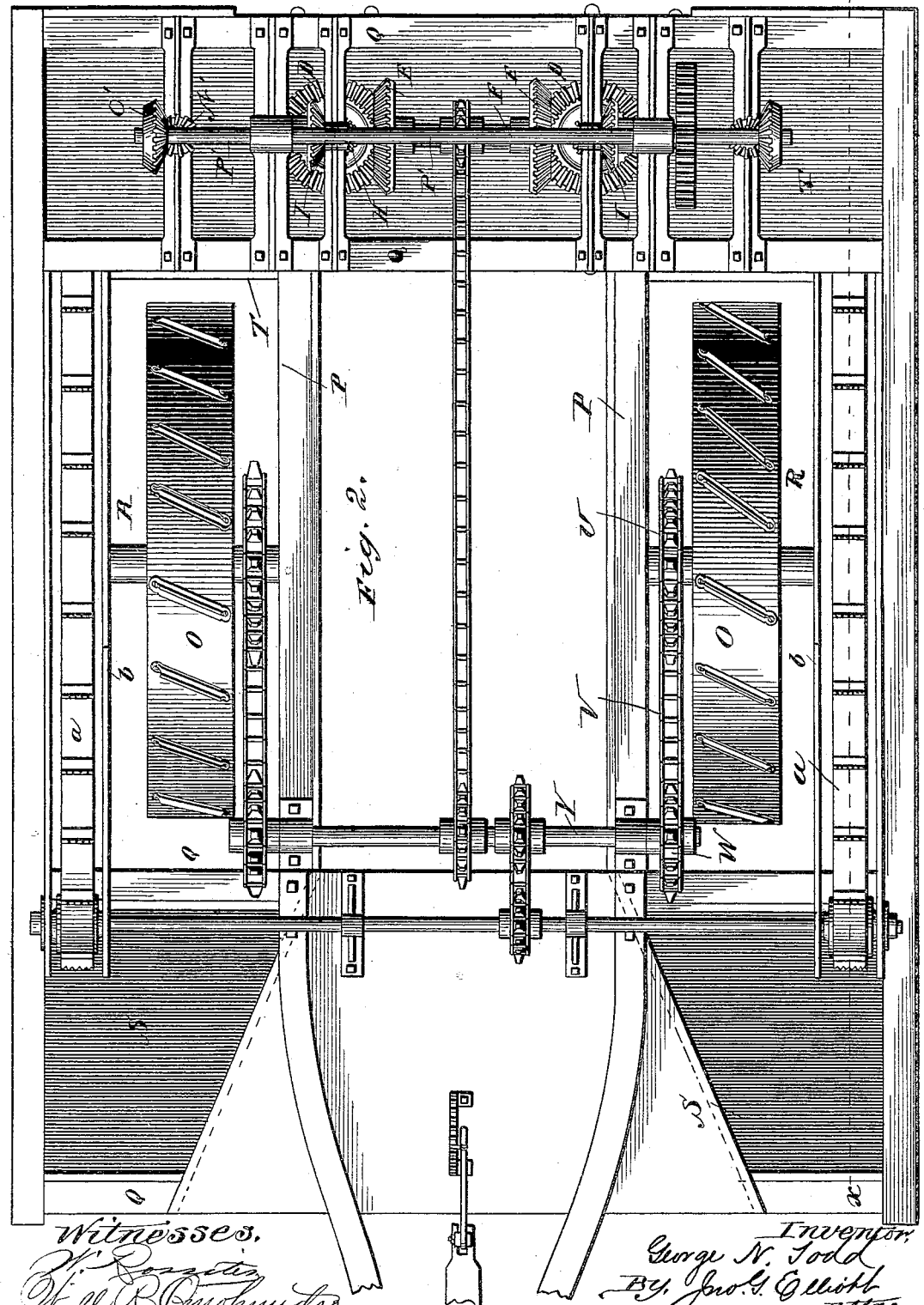

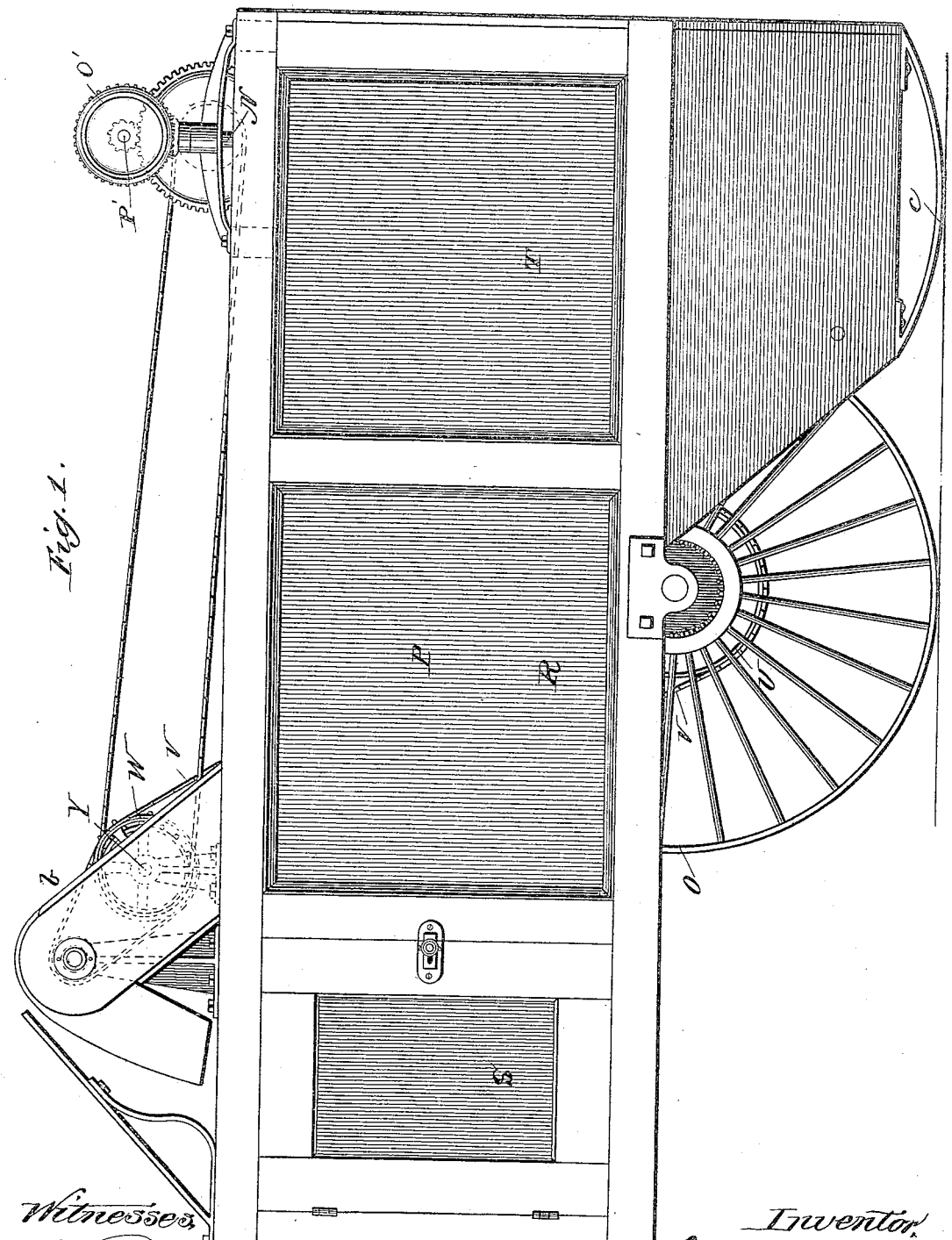

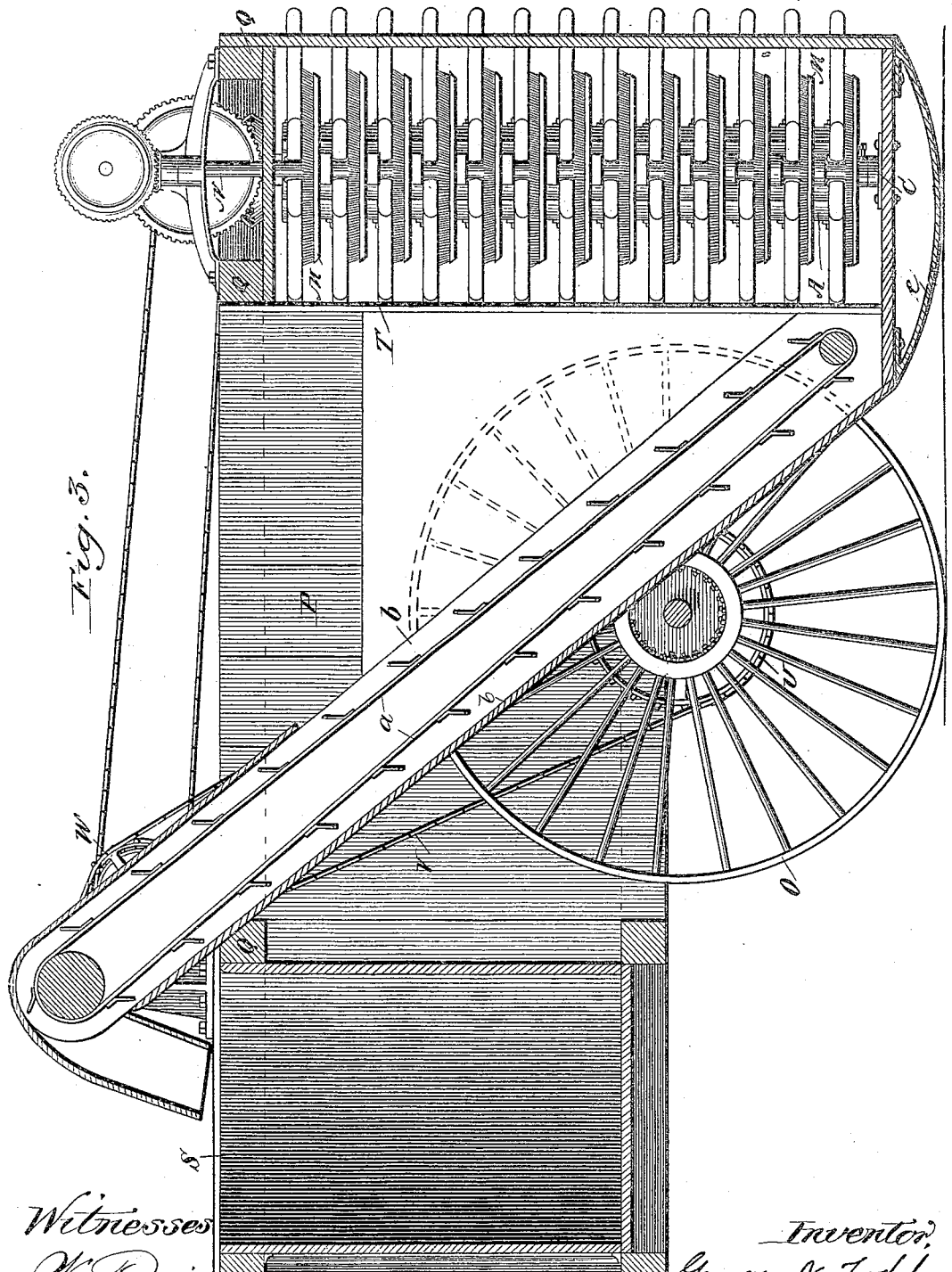

(No Model.)  
G. N. TODD.  
COTTON HARVESTER.  
No. 529,430. Patented Nov. 20, 1894.
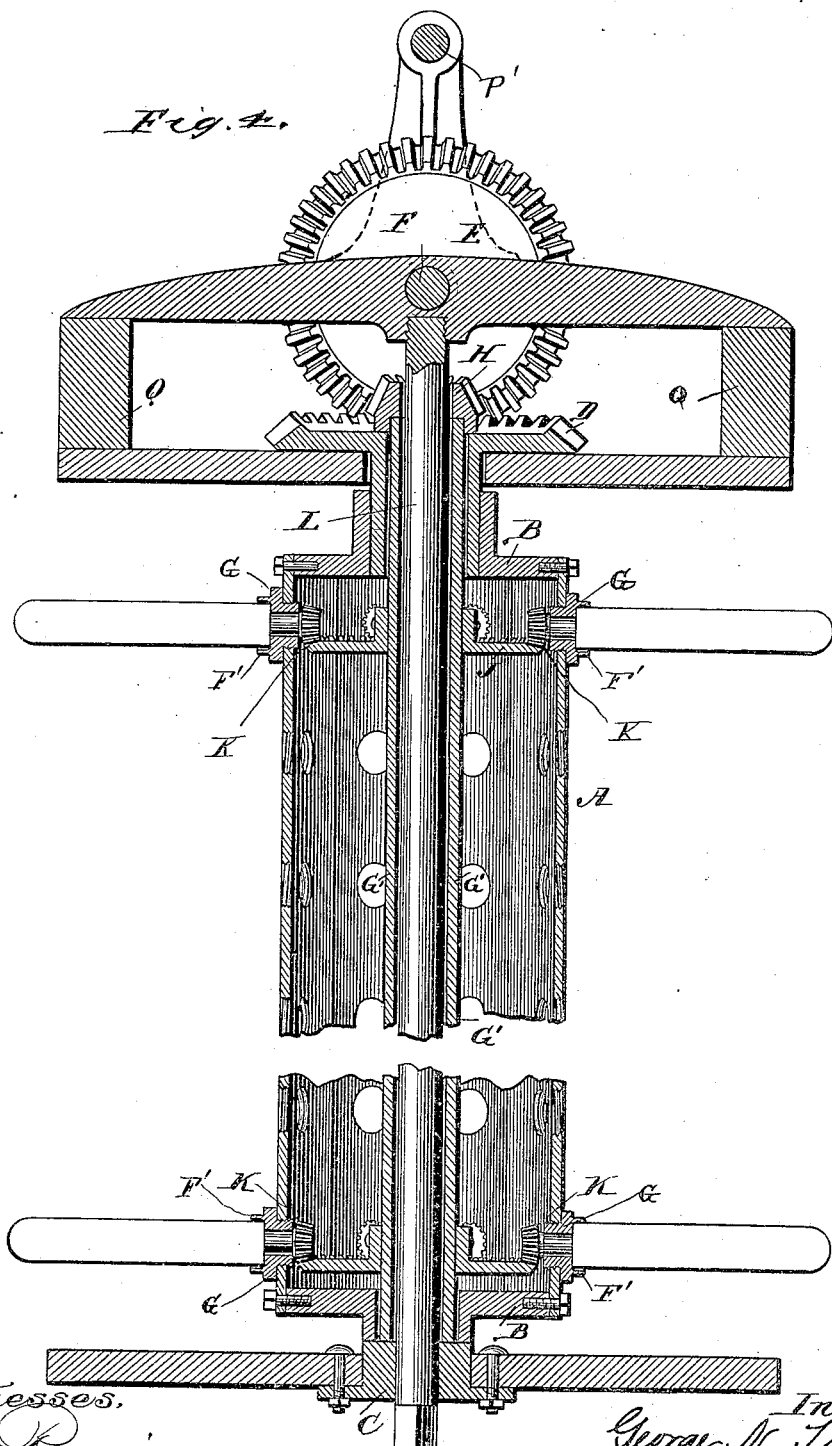

(No Model.) 6 Sheets—Sheet 5.
G. N. TODD.
COTTON HARVESTER.
No. 529,430. Patented Nov. 20, 1894.
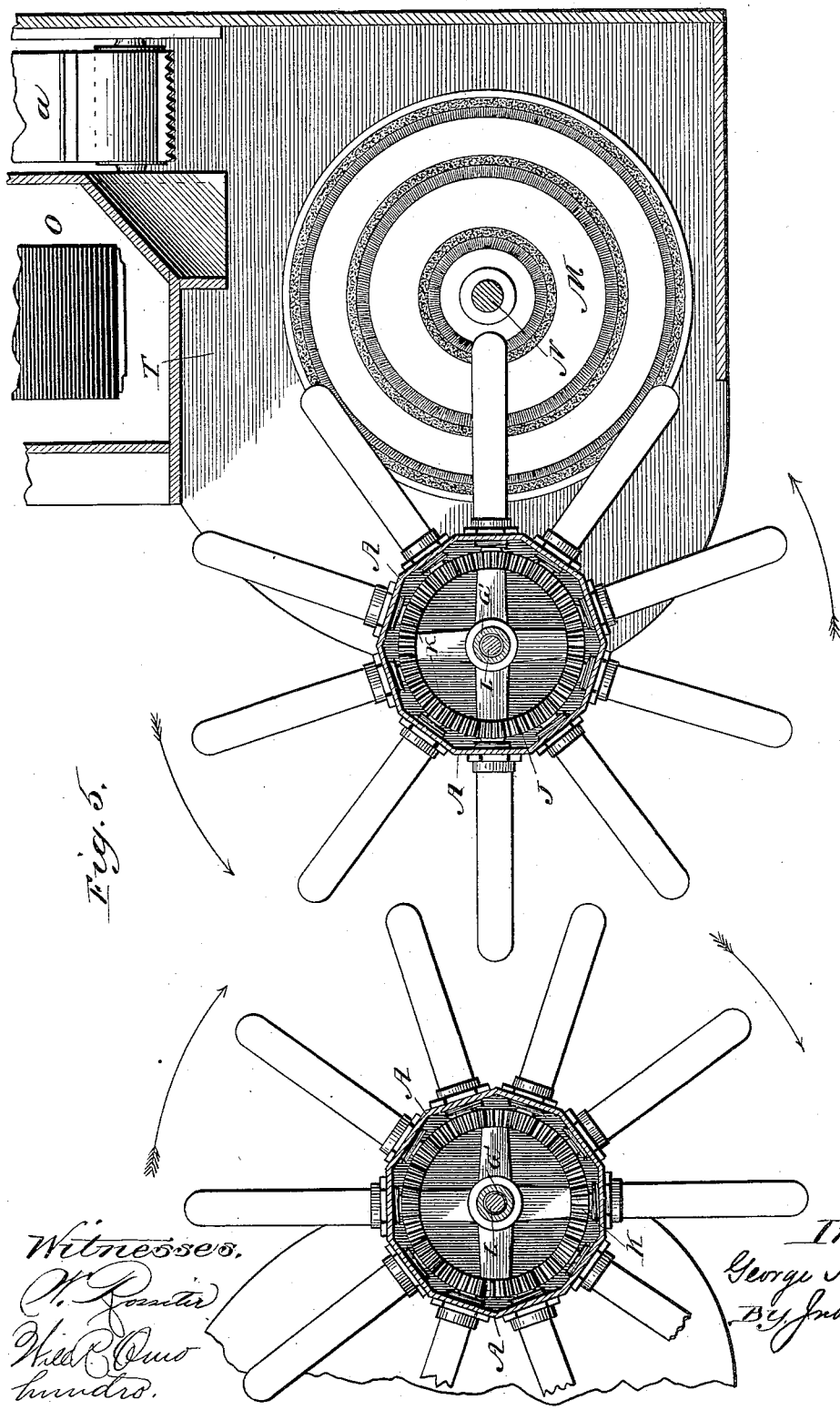

(No Model.) 6 Sheets—Sheet 6.
G. N. TODD.
COTTON HARVESTER.
No. 529,430. Patented Nov. 20, 1894.
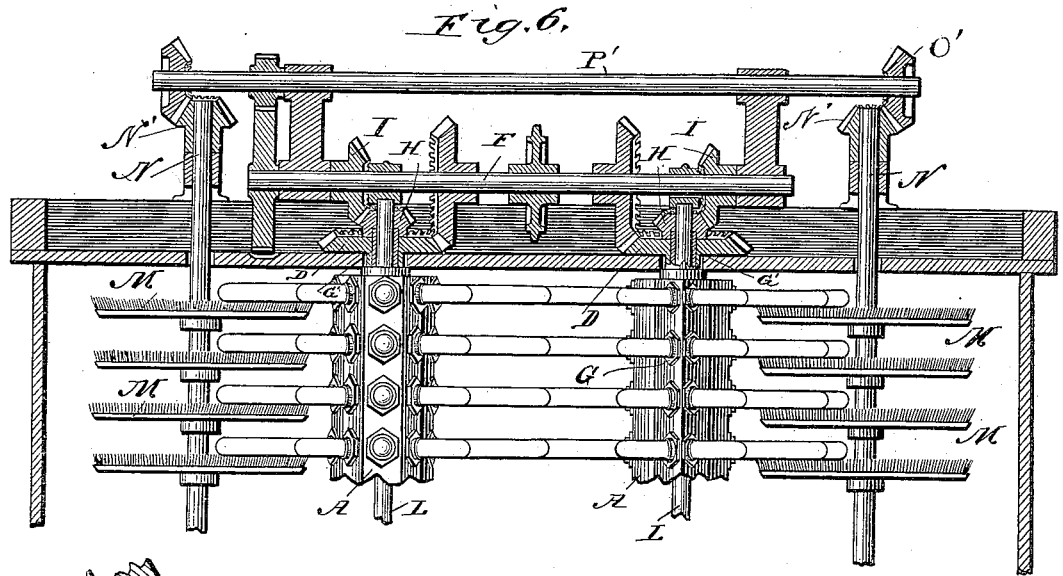
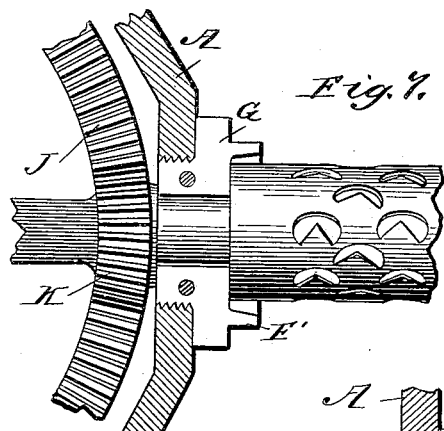
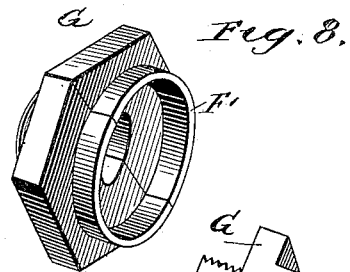
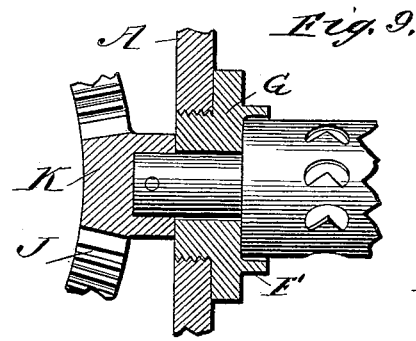
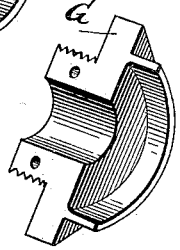
Witnesses.
W. Rossiter
Will R. Cushundro
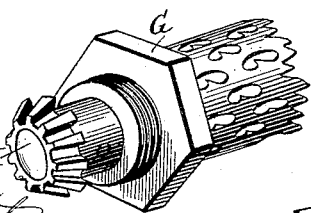
Inventor:
George N. Todd
By Jno. G. Elliott
Atty.
THE NORRIS PETERS CO., PHOTO-LITHO., WASHINGTON, D. C.

UNITED STATES PATENT OFFICE.

GEORGE N. TODD, OF CHICAGO, ILLINOIS, ASSIGNOR TO THE TODD COTTON HARVESTER COMPANY.

COTTON-HARVESTER.

SPECIFICATION forming part of Letters Patent No. 529,430, dated November 20, 1894.

Application filed January 18, 1887. Serial No. 224,684. (No model.)

*To all whom it may concern:*

Be it known that I, GEORGE N. TODD, a citizen of the United States, residing at Chicago, in the county of Cook and State of Illinois, have invented certain new and useful Improvements in Cotton-Harvesters, of which the following is a specification.

This invention relates to improvements in cotton harvesters, but is especially designed as an improvement upon the invention set forth in my application for Letters Patent, Serial No. 218,853, filed November 15, 1886, in which were shown the picker stem supports and mechanism for operating the same carried in the forward part of a suitable frame having a central passage way and mounted upon four running wheels, and in which also, the picker stem supports had an axial rotation, independent of their movement of translation during the forward travel of the machine.

The prime object of this invention is to simplify the construction of the machine, and thereby reduce the cost of manufacture, and at the same time so distribute the weight of the machine relative to its ground support, that the machine may be carried upon a single pair of wheels.

Another primary object of my invention is to provide improved means for accelerating the individual axial rotation of the picker stems of a cotton harvester beyond the speed of axial rotation which would result merely from the bodily travel of such stems about the axis of their carrying drum or support; and to have such accelerated axial rotation of the stems gained independent of their bodily travel whereby the speed of axial rotation of the picker stems may be changed or varied independent of the speed of their bodily travel about the axis of their support, thereby materially promoting the effectiveness of the picker stems in the gathering of cotton.

A further primary object of my invention is to effectively remove the gathered cotton from picker stems so operated, by means of traveling cleaner devices located in the path of movement of the stems and serving to strip the gathered cotton from said stems after each thrust into the cotton plants, and notwithstanding that the cotton may be wound upon the stems during gathering action thereof.

Other objects are to provide a rotatable picker stem support of a new and novel construction, combining economy, strength and durability, and to provide certain other details of construction in the carrying out of my invention all as illustrated in the accompanying drawings, in which—

Figure 1 represents a side elevation of a cotton harvester embodying my invention; Fig. 2, a plan view thereof; Fig. 3, a vertical longitudinal sectional view on the line X X, Fig. 2; Fig. 4, a detail central section through the rotatable picker-stem support and the mechanisms for operating the same; Fig. 5, a detail horizontal section through a portion of the machine showing the relative locations of the picker stems, their supports, the cleaning and elevating devices; Fig. 6, a detail transverse vertical section through a portion of the machine showing the stems and brushes and the mechanisms employed for operating them; Fig. 7, a detail horizontal section through the picker stem support showing the stem and its gear in plan; Fig. 8, a detail view, showing the construction of the removable bearings of the picker stems and the manner of securing them to the supports; Fig. 9, a similar view to Fig. 7 showing a modification of my invention, and Fig. 10, a perspective view of a portion of one of the picker stems like that shown in Fig. 9, and its bearing.

Similar letters of reference indicate the same parts throughout the several figures of the drawings.

Referring by letter to the accompanying drawings, A A indicate hollow shell or picker stem supports, preferably consisting of castings, having in cross section a polygonal outline, which, for the purpose intended, I have found most advantageous when having ten sides. These shells or supports have open ends into which are fitted suitable heads B B, by means of which they are supported and held in an upright position, and in perfect alignment at all times. The heads in the lower ends of the supports are provided with downwardly projecting hubs, the faces of which rest upon a metallic plate C secured to a stationary portion of the supporting frame, the detailed construction of which will be described farther on. The upper head is also provided with a hub projecting upwardly, to which is secured a beveled gear D, the hollow hub of which fits within the hollow hub of the head, and also passes through a hole in a portion of the supporting frame, wherein it has its bearing, and to which gear wheel power is applied for rotating the picker stem supports, through the medium of the beveled gear E mounted upon a cross drive shaft F, to which power is transmitted from the ground or drive wheels of the machine.

The straight faces of the shell or picker stem supports are tapped at regular intervals by screw threaded holes forming several horizontal series around the said supports into which holes are screwed independent or cast bearings G, preferably composed of two halves or sections secured together by pins or otherwise, in order that the picker stems having gears cast thereon, may be the more readily inserted, but it would be no departure from my invention to cast these bearings in a single piece as shown in Fig. 9, which construction would be preferred in cases where the picker stems had the gear removably secured thereto. These bearings are also provided with hoods or guards F', projecting partly over the picker stems so as to prevent the lodgment of cotton fibers upon the bearing surfaces thereof. These removable bearings are essential in a construction of this character as otherwise great difficulty would be encountered in setting the stems in their bearings, and they are of especial utility in cases where a picker stem becomes bent or injured accidentally or otherwise, permitting the ready removal of this stem without disturbing any of the others of the running gear of the machine.

Passing axially through the picker stem supports, are hollow shafts G', also having an end bearing at the lower ends thereof upon the plate C, and passing freely through the hub of the gear wheel D, to the upper ends of which shafts, projecting beyond the wheels D, are rigidly secured small cog wheels H, to which power is applied through the medium of a smaller gear wheel I, also mounted upon the cross shaft F, by means of which the rotary motion is imparted to the shafts G' which have secured thereto, at regular intervals, a series of annular toothed racks or gears J, into which mesh the teeth of the spur gears K, secured to the inner ends of the picker stems, whereby during their circular movement of translation, an axial rotation is imparted to said stems.

In the cotton harvesters as heretofore constructed in which rotatable drums or picker stem supports have been employed, the speed of rotation of the picker stems has been determined by the relative proportions between the fixed rack within the drum and the spur gear on the end of the picker stem, which speed is, of course limited by the necessarily small diameter of the drum that is practically operative in a machine of this character, and as a result of such construction, the machine is rendered practical only to an indifferent degree, for practice has demonstrated that a very high speed is requisite in the picker stem, in order to successfully accomplish the gathering of the cotton.

In all such prior constructions where the internal annular gears for driving the picker-stems are held fixed during the rotation of the picker-stem supports and the bodily travel of the picker-stems, the distance traveled by, and consequently the speed of travel of the gears or pinions upon the picker-stems, is exactly the same as that of their bodily travel, and this independent of the proportion existing between the annular gears and the pinions on the picker-stems by which the stems are rotated. For instance, if the stems are dragged a linear distance of three inches along the fixed gear, the periphery of the picker-stem pinions will also have traveled three inches, because all the travel which the periphery of the pinion can gain is imparted thereto by the stationary gear over which they are drawn, and of course the periphery of the picker-stem pinions can travel no more or less than the surface over which they are drawn, just the same as the periphery or rim of a wagon wheel can travel no faster or a greater distance than the ground over which it is drawn; but, on the other hand, if the internal driving gears are rotated in either direction, then the peripheries of the picker-stem pinions will have a faster travel, that is, travel a greater distance in a given time than their bodily travel.

I have provided the mechanisms just previously described by means of which not only does the drum rotate about its axis, carrying with it the picker stems, but the annular toothed racks or gears may also be rotated in the same or in a reverse direction to that of the drum, thereby changing the speed of rotation of the picker stems to any desired extent. For the purpose of steadying these several parts in their operation, I prefer to pass axially through the hollow rotating shaft G', a solid non-rotating shaft L, extending through the plate C at the lower end thereof and screwed or otherwise rigidly attached to a stationary portion of the supporting frame.

To remove the gathered cotton from the stems, I prefer to employ a series of disk-like brushes M M, mounted at regular intervals upon vertical shafts N N, one on each side of the machine, between which disk and across the face of each one of them, the picker stems pass during their circular movement of translation, the said brushes themselves being rotated at the same time by means of gears N'—N' on the upper ends of the shafts N—N meshing with corresponding beveled gears O'—O' mounted upon a counter shaft P' which is a gear connection $q'$ with the drive shaft F, and as these cleaner brushes and their relations to the picker stems have been fully described and claimed in my aforesaid application, I do not deem it necessary to herein describe them more in detail.

I may here state that so far as relates to this invention, the form of the traveling cleaner may be varied without interfering with the successful operation of the machine, for instead of the rotary traveling cleaner shown in this case I may employ such a form of traveling cleaner as is illustrated in my application for Letters Patent, Serial No. 171,561, filed July 13, 1885, in which a traveling toothed belt is employed.

In order to support and furnish driving power for the mechanisms hereinbefore described, I have provided a frame mounted, about the center of length thereof, upon a pair of ground or drive wheels O O, which frame is composed of two halves or sections P P, connected at the top only by means of suitable cross beams or sills Q Q, thereby leaving an open passage way, centrally and through the machine for accommodation of the cotton plants, the machine as in others of this class, being designed to straddle the row of plants upon which it is working, one section of the frame and one ground wheel being on each side of the row.

The machine may be entirely boarded over at the top between the cross sills, excepting the openings to the cotton receptacles, or it may be only partly boarded over as shown in Fig. 2 the boarding at best simply being for the better protection of the parts from the weather and not materially aiding in strengthening the structure. As the two halves of the machine on each side of the longitudinal center are identical, in the further description of these parts I will refer to one side only.

The vertical sides and ends of the section are boarded over so to form an oblong box with a central and two end compartments, R, S, and T respectively, the latter being obtained by means of transverse partitions, intermediate the ends of the box, and in the central compartment is located the drive wheel, loosely mounted upon an axle, journaled in the inner and outer side walls of the section, to which axle or wheel is also secured a sprocket wheel U, which through the medium of a sprocket chain V and wheel W transmits the power to the main drive shaft Y, from which it is in turn communicated to the other operating parts of the machine through the medium of any suitable gearing.

Within the rear compartment are located the picker stems and their supports and the mechanisms for cleaning the stems hereinbefore described, the side of this compartment next the inside of the machine, not being boarded over so that the plants may be freely engaged by the picker stems.

The forward compartment S of the frame constitutes a cotton receptacle and is boarded over on all sides except the top at which point the cotton is delivered thereto from an elevator or carrier $a$, extending in an inclined plane from the lower end of the rear compartment T to the top of the machine, above the opening of the cotton receptacle S, which conveyer works in a suitable passage or chute $b$, rigidly secured to or forming a part of the section, and occupying a portion of the space of the central compartment R between the wheel and the outer wall thereof.

Access is gained to the cotton receptacle by means of a door formed in the outside wall of the section, through which the cotton is designed to be removed by hand.

The forward end of the section on the inside thereof is formed at an angle so that the two sections when placed together form an enlarged opening, converging toward the central passage way so as to permit the more ready entrance of the plants into this passage before being subjected to the action of the picker stems.

Secured to the under side or bottom of the section, immediately below the rear compartment, is a runner $c$ consisting of curved or bent wood, iron or other suitable material, serving in the capacity of a shoe, which runner, during the major portion of the operation of the machine is designed to ride clear of the ground, but when the ground wheel sinks into soft ground, the shoe owing to the breadth of its tread, will ride upon the surface of the ground and effectually prevent the picker stems from coming in contact with the ground, the machine at the same time being adapted and arranged by mechanisms ordinarily employed for this purpose to tilt upon the axles of the ground wheels.

The weight of the machine is designed to be so distributed relative to the ground wheel that when the driver is seated upon the machine forward of these ground wheels, the machine will about balance, with the excess of weight, if any, to the rear of the machine, which will be readily taken up by the shoes before mentioned.

In my application aforesaid, in which the cotton picker stems and their operating mechanisms are located forward of the drive wheels, I found by practical experiment that in soft ground the caster wheels designed to take up the main portion of the weight, would sink into the ground to such an extent that the picker stems would engage the ground, thereby blocking the action of the machine, but with the construction just described in which these parts are located to the rear of the drive wheels and the caster wheels are replaced by broad shoes, no such accident can occur.

The operation of the machine is as follows: The cotton is gathered by the picker stems and transferred from them to the cleaner brushes during their circular movement of translation, which in turn throw the cotton, by centrifugal force, into the end of the rear compartments, which cotton falling to the bottom thereof, is immediately engaged by the elevating belt, upon which it is in a great measure forced by the suction through the opening in the forward part of this compartment, leading to the elevator chute, by which it is carried up the incline and deposited in the cotton receptacle at the forward end of the machine, into which it is packed by the driver until the receptacle is full, when the cotton may be removed in basketfuls in the usual manner.

Having described my invention, what I claim, and desire to secure by Letters Patent, is—

1. In a cotton harvester a supporting frame consisting of two sections connected together at the top only, having an open central passage way and mounted upon a single pair of ground wheels, and each of said sections being provided with a middle and two end compartments, the former for reception of the drive wheels, and the latter, front and rear respectively, constituting cotton receptacles, and chambers for containing the picker stem operating mechanisms, in combination with inclined elevators or carriers working through said central compartments and extending from the lower end of the picker stem chambers to the upper ends of the cotton receptacles, substantially as described.

2. In a cotton harvester a supporting frame consisting of two sections connected together at the top only and mounted upon a single pair of ground wheels and each of said sections being provided with a middle and two end compartments and the latter, front and rear respectively, constituting cotton receptacles, and chambers for containing the picker stem operating mechanism, in combination with inclined elevators or carriers working through said central compartments and extending from the lower end of the picker stem chambers to the upper end of the cotton receptacles, and shoes or runners secured to the under side of each of said sections and underlying the picker stem chambers, substantially as described.

3. In a cotton harvester a supporting frame consisting of two sections connected together at the top only and each of them provided with a middle and two end compartments, the forward one of which constitutes a cotton receptacle, in combination with rotatable picker stem supports journaled in said rear compartments, picker stems projecting radially therefrom, a series of rotatable disk-like cleaner brushes in the path of travel of said stems, elevators or carriers extending from the bottoms of said rear compartments to the top of the cotton receptacle, ground wheels located in said middle compartments and gear connections between said wheels and the elevator, picker stem supports and cleaner brushes, substantially as described.

4. In a cotton harvester a rotatable shell or hollow picker stem support, picker stems projecting radially therefrom and means for rotating said support, in combination with a rotatable shaft passing axially through said support, annular racks or gears mounted thereon and gears on the picker stems for engaging said annular racks, and means for rotating said shaft continuously in the direction opposite that of the support, substantially as described.

5. In a cotton harvester a rotatable picker stem support, picker stems projecting radially therefrom, a gear rigidly secured to said support, and bearings for said support, in combination with a hollow rotatable shaft passing axially through said support, annular racks or gears secured thereto, gears on the picker stems for engaging said racks, a gear secured to one end of said shaft for rotating the same continuously in the direction opposite that of the support and a fixed shaft or rod passing axially through said shaft and secured to the supporting frame, substantially as described.

6. In a cotton harvester, a picker stem support consisting of a hollow shell or casting having a polygonal outline in cross section and provided with longitudinal series of screw threaded openings in the straight sides thereof, in combination with a picker stem bearing having screw threaded ends fitting said openings, substantially as described.

7. In a cotton harvester a detachable picker stem bearing cast in halves or sections having a screw threaded end and provided with a square or straight sided head, substantially as described.

8. A picker stem support consisting of a hollow shell or casting having a series of openings in the sides thereof, in combination with picker stems projecting radially therefrom, gears on said stems of less diameters than said openings and removable bearings for said stems, fitting in said openings, substantially as described.

9. In a cotton harvester, a detachable picker stem bearing having a hood or guard projecting partially over the stem whereby cotton is prevented from lodging upon the bearing surfaces of said bearing, substantially as described.

10. In a cotton harvester, the combination with a rotatable drum, of horizontal series of picker stems journaled in and projecting radially from said drum, gears secured to said stems, and series of rotatable gears corresponding in number with the series of stems and meshing with the gears on said stem for driving the same, substantially as described.

11. In a cotton harvester, the combination with a rotatable drum and horizontal series of picker stems journaled therein, of gears on the ends of said stems, a series of rotatable gears corresponding in number with the series of stems and meshing with the gears on said stems, and means for imparting an axial rotation to said series of gears continuously in one direction, substantially as described.

12. In a cotton harvester, the combination with a rotatable drum horizontal series of picker stems journaled therein, gears on the ends of said stems, a series of rotatable gears corresponding in number with the series of stems and meshing with the gears on said stems and means for imparting an axial rotation to said series of gears continuously in one direction, of a traveling cleaner located in the path of movement of said stems, substantially as described.

13. In a cotton harvester, a rotatable drum, and a series of picker stems projecting radially therefrom, in combination with gears on the ends of said stems and internal annular rotatable gear meshing with the gears on said stems, and means for rotating said internal gear continuously in one direction, substantially as described.

14. In a cotton harvester, the combination with a rotatable drum, picker stems journaled therein, having pinions on their inner ends, and means for rotating said drum, of a series of internal annular gears meshing with the pinions on said stems, and means independent of the rotation of said support for imparting to said annular gears an axial rotation, substantially as described.

15. In a cotton harvester, the combination with a rotatable drum, means for rotating the same, and picker stems journaled in and projecting radially from said drum, having pinions on the inner ends thereof, of an internal shaft upon which said drum freely rotates, and a series of annular gears on said shaft meshing with the pinions upon the picker stems, and a gear connection for imparting an axial rotation to said shaft in a direction opposite to that of the drum, substantially as described.

16. In a cotton harvester, the combination with a fixed tie rod, a rotatable drum journaled thereon, means for rotating the same, and picker stems journaled in and projecting radially from said drum having pinions on the inner ends thereof, of an internal hollow shaft sleeved upon said tie rod, a series of annular gears on said shaft meshing with the pinions upon the picker stems, and a gear connection for imparting an axial rotation to said shaft, substantially as described.

GEORGE N. TODD.

Witnesses:
WILL R. OMOHUNDRO,
W. W. ELLIOTT.